US012812538B2

(12) United States Patent
Wentzloff et al.

(10) Patent No.: US 12,812,538 B2
(45) **Date of Patent: *Nov. 24, 2026**

(54) METHOD AND SYSTEM FOR LOW POWER AND SECURE WAKE-UP RADIO

(71) Applicant: EVERACTIVE INC., Ann Arbor, MI (US)

(72) Inventors: David D Wentzloff, Ann Arbor, MI (US); Kuo-Ken Huang, San Jose, CA (US); Farah Bassam Yahya, Charlottesville, VA (US); Jonathan Kirk Brown, Okemos, MI (US); Richard Kevin Sawyer, Jr., Charlottesville, VA (US); Nicholas Andrew Clark Collins, Ann Arbor, MI (US); David Sharif Abdallah, Charlottesville, VA (US); Christopher Shaw, Charlottesville, VA (US)

(73) Assignee: Everactive Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/820,784

(22) Filed: Aug. 30, 2024

(65) Prior Publication Data

US 2024/0422678 A1 Dec. 19, 2024

Related U.S. Application Data

(63) Continuation-in-part of application No. 18/348,480, filed on Jul. 7, 2023, now Pat. No. 12,082,114, which (Continued)

(51) Int. Cl.
*H04W 52/02* (2009.01)
*H04B 17/318* (2015.01)
(Continued)

(52) U.S. Cl.
CPC ...... *H04W 52/0229* (2013.01); *H04B 17/318* (2015.01); *H04B 17/336* (2015.01); (Continued)

(58) Field of Classification Search
CPC . H04W 52/0229; H04W 12/03; H04W 12/08; H04W 84/18; H04B 17/318; H04B 17/336; H04L 9/32; Y02D 30/70
See application file for complete search history.

(56) References Cited

U.S. PATENT DOCUMENTS

| | | | |
|---|---|---|---|
| 6,343,185 | B1 | 1/2002 | Aoshima et al. |
| 6,535,724 | B1 | 3/2003 | Pernici et al. |

(Continued)

OTHER PUBLICATIONS

Berk, Vincent, et al., "Detection of Covert Channel Encoding in Network Packet Delays," Technical Report TR2005-536, Department of Computer Sciences, Dartmouth College, Hanover, NH, Aug. 2005.

(Continued)

*Primary Examiner* — Eugene Yun
(74) *Attorney, Agent, or Firm* — Dilworth & Barrese, LLP.; Barbara B. Courtney, Esq.

(57) ABSTRACT

A wake-up radio system in a wireless sensor network, the wake-up radio comprising: an analog front end configured to communicate with matching network; an analog to digital converter coupled to the analog front end; and a digital baseband coupled to the analog to digital converter, wherein the digital baseband outputs a fast wake-up signal and a secure wake-up signal, and wherein the wake-up radio listens to all channels simultaneously.

22 Claims, 5 Drawing Sheets

Related U.S. Application Data is a continuation of application No. 17/176,023, filed on Feb. 15, 2021, now Pat. No. 11,758,480.

(60) Provisional application No. 62/976,382, filed on Feb. 14, 2020.

(51) Int. Cl.

| | |
|---|---|
| ***H04B 17/336*** | (2015.01) |
| ***H04L 9/32*** | (2006.01) |
| ***H04W 12/03*** | (2021.01) |
| ***H04W 12/08*** | (2021.01) |
| *H04W 84/18* | (2009.01) |

(52) U.S. Cl.

CPC ............... *H04L 9/32* (2013.01); *H04W 12/03* (2021.01); *H04W 12/08* (2013.01); *H04W 84/18* (2013.01)

(56) References Cited

U.S. PATENT DOCUMENTS

| | | | | |
|---|---|---|---|---|
| 6,646,604 | B2 | 11/2003 | Anderson | |
| 6,853,835 | B2 | 2/2005 | Wynbeck | |
| 6,867,696 | B2 | 3/2005 | Becken | |
| 7,283,475 | B2 | 10/2007 | Fortin et al. | |
| 7,362,781 | B2 | 4/2008 | Rhoads | |
| 7,415,018 | B2 | 8/2008 | Jones et al. | |
| 7,571,269 | B2 | 8/2009 | Schmidt et al. | |
| 7,693,191 | B2 | 4/2010 | Gorday | |
| 7,715,446 | B2 | 5/2010 | Rhoads | |
| 7,813,344 | B2 | 10/2010 | Cheswick | |
| 8,027,663 | B2 | 9/2011 | Rhoads | |
| 8,081,944 | B2 | 12/2011 | Shaolin | |
| 8,325,704 | B1 | 12/2012 | Lemkin et al. | |
| 8,848,777 | B2 | 9/2014 | Wang | |
| 10,089,856 | B1 | 10/2018 | Zong | |
| 11,758,480 | B2 | 9/2023 | Wentzloff | |
| 12,082,114 | B2 * | 9/2024 | Wentzloff | H04W 12/106 |
| 2003/0040326 | A1 | 2/2003 | Levy et al. | |
| 2003/0076782 | A1 | 4/2003 | Fortin | |
| 2003/0084148 | A1 | 5/2003 | Cousins | |
| 2003/0091064 | A1 | 5/2003 | Partridge | |
| 2003/0097439 | A1 | 5/2003 | Strayer | |
| 2003/0203740 | A1 | 10/2003 | Bahl | |
| 2004/0059935 | A1 | 3/2004 | Cousins | |
| 2005/0054319 | A1 | 3/2005 | Tamaki | |
| 2005/0169201 | A1 | 8/2005 | Huylebroeck | |
| 2005/0186906 | A1 | 8/2005 | Hussmann | |
| 2007/0082647 | A1 | 4/2007 | Behzad | |
| 2007/0082715 | A1 | 4/2007 | Rofougaran | |
| 2008/0046549 | A1 | 2/2008 | Saxena | |
| 2008/0240167 | A1 | 10/2008 | Keaney | |
| 2009/0047991 | A1 | 2/2009 | Elg | |
| 2010/0003935 | A1 | 1/2010 | Behzad | |
| 2010/0067546 | A1 | 3/2010 | Mishra | |
| 2010/0079254 | A1 | 4/2010 | Koo et al. | |
| 2010/0105346 | A1 | 4/2010 | Huang | |
| 2010/0120362 | A1 | 5/2010 | Walley et al. | |
| 2010/0202767 | A1 | 8/2010 | Shirakawa et al. | |
| 2011/0074552 | A1 | 3/2011 | Norair | |
| 2011/0299638 | A1 | 12/2011 | Gauthier | |
| 2011/0317600 | A1 | 12/2011 | Thomson et al. | |
| 2012/0161942 | A1 | 6/2012 | Muellner | |
| 2013/0039239 | A1 | 2/2013 | Lin | |
| 2013/0040573 | A1 | 2/2013 | Hillyard | |
| 2013/0049839 | A1 | 2/2013 | Cheng | |
| 2013/0077779 | A1 | 3/2013 | Batra | |
| 2013/0322313 | A1 | 12/2013 | Sikri | |
| 2013/0336188 | A1 | 12/2013 | Yomo | |
| 2014/0126442 | A1 | 5/2014 | Jafarian | |
| 2014/0146756 | A1 | 5/2014 | Sahin | |
| 2015/0036575 | A1 | 2/2015 | Li | |
| 2015/0282247 | A1 | 10/2015 | Batchu | |
| 2015/0333534 | A1 | 11/2015 | Liu | |
| 2018/0115195 | A1 | 4/2018 | Dalwadi | |
| 2019/0097633 | A1 | 3/2019 | Ullmann | |
| 2019/0222126 | A1 | 7/2019 | Parisi | |
| 2020/0029315 | A1 | 1/2020 | Lin | |

OTHER PUBLICATIONS

Calhoun, Telvis E., et al., "An 802.11 MAC Layer Covert Channel," Wireless Communications and Mobile Computing (2010), Wiley InterScience www.interscience.wiley.com; DOI: 10.1002/wcm.969, Department of Computer Sciences, Georgia State University, Atlanta, GA 30303, USA.

Dye, Derek, "Bandwidth and detection of packet length cover channels," Issue date Mar. 2011, Monterey, California, Naval Postgraduate School, http://hdl.handle.net/10945/5724.

Edwards, Jonathan, "Covert Channels in Ad Hoc Networking: An Analysis Using the Optimized Link State Routing Protocol," A thesis submitted to the Faculty of Graduate and Postdoctoral Affairs in partial fulfillment of the requirements for the degree of Master of Applied Sciences in Electrical Computer Engineering, Carleton University, Ontario, Canada, Apr. 2012.

Girling, Gary, "Covert Channels in LAN's," IEEE Transactions on Software Engineering, vol. SE-13, No. 2, Feb. 1987.

Ji, Liping, et al., "A Novel Covert Channel Based on Length of Messages," 2009 International Symposium on Information Engineering and Electronic Commerce, Harbin Institute of Technology, Shenzhen Graduate School Shenzhen, P.R. China.

Kondo, Yoshihisa, et al., "Wake-up Radio using IEEE 802.11 Frame Length Modulation for Radio-on-Demand Wireless LAN," 2011 IEE 22nd International Symposium on Personal, Indoor and Mobile Radio Communications.

Kratzer, Christian, et al., "WLAN Steganography: A First Practical Reivew," Copyright 2006 ACM 1-59593-493-6060009, Department of Computer Science, Research Group Multimedia and Security, MM & Sec '06, Sep. 26-27, 2006, Geneva, Switzerland.

Lucena, Norka B., et al., "Covert Channels in IPV6," Syracuse University, Syracuse, NY 13244 USA, Copyright 2006, Springer-Verlag Berlin Heidelberg 2006, pp. 147-166.

Padlipsky, M.A., et al., "Limitations of End-to-End Encryption in Secure Computer Networks", Deputy for Technical Operations, Electronic Systems Division, Air Force Systems Command, Hanscom Air Force Base, Massachusetts; Pepared by The Mitre Corporation, Project 672B, Aug. 1978.

Panajotov, Boris, et al., "Covert Channels in TCP/IP Protocol Stack," ICT Innovations 2013 Web Proceedings ISSN 1857-7288, University "Goce Delcev", Faculty of Computer Science, "Krste Misirkov" bb, 2000, Stip, Republic of Macedonia, pp. 190-199.

Scott, Carlos, "Network Covert Channels: Review of Current State and Analysis of Viability of the Use of X.509 Certificates for Covert Communications," Technical Report RHUL-MA-2008-11, Jan. 15, 2008, Royal Holloway University of London, Department of Mathematics, England.

Stelte, Bjorn, et al., "Concealed Integrity Monitoring for Wireless Sensor Networks," Wireless Sensor Network, Mar. 10-17, 2011, doi: 10.4236/wsn.2011.31002, Published online Jan. 2011, http://www.scirp.org/journal.wsn.

Zander, Sebastian, et al., "A Survey of Covert Channels and Countermeasures in Computer Network Protocols," 3rd Quarter 2007, vol. 9, No. 3, IEE Communications Survey, The Electronic Magazine of Original Peer-Reviewed Survey Articles, www.comsoc.org/pubs/surveys.

Zander, Sebastian, "Performance of Selected Noisy Covert Channels and Their Countermeasures in IP Networks," Thesis submitted in accordance with the requirements for the degree of Doctor of Philosophy, Swinburne University of Technology, Melbourne, Australia, Copyright May 2010.

Patent Cooperation Treaty, International Searching Authority, "Notification of Transmittal of the International Search Report and the Written Opinion," PCT Application No. PCT/US16/27280; date of mailing Jul. 15, 2016.

(56) References Cited

OTHER PUBLICATIONS

Patent Cooperation Treaty, "International Preliminary Report on Patentability," PCT Application No. PCT/US2014/028889, issued Sep. 15, 2015.
Chinese Intellectual Property Office, Patent Application No. 201480028106.0, English translation of First Office Action Issued Jul. 14, 2017.
Chinese Intellectual Property Office, Patent Application No. 201480028106.0, English translation of Third Office Action Issued Aug. 16, 2018.
European Patent Office, EP Patent Application No. 14771024.8, Examination Report No. 1, issued Apr. 25, 2017.
European Patent Office, EP Patent Application No. 14771024.8, Examination Report No. 2, issued Feb. 19, 2018.
Korean Intellectual Property Office (KIPO), Patent Application No. 10-2015-7029467, English translation of Office Action, received from Korean associates on Aug. 21, 2017.
Korean Intellectual Property Office (KIPO), Patent Application No. 10-2015-7029467, English translation of Office Action, received from Korean associates on Jul. 10, 2018.

* cited by examiner

METHOD AND SYSTEM FOR LOW POWER AND SECURE WAKE-UP RADIO

RELATED APPLICATIONS

This application is a continuation-in-part of U.S. patent application Ser. No. 18/348,480 filed Jul. 7, 2023, which is a continuation of U.S. patent application Ser. No. 17/176,023 filed Feb. 15, 2021, which claims priority from U.S. Provisional Patent Application No. 62/976,382, filed Feb. 14, 2020. All of the foregoing applications are incorporated by reference in their entirety herein.

FIELD OF THE INVENTION

The invention is in the field of low-power sensor networks such as those that facilitate the internet of things (IoT), and more specifically in the area of wake-up radios.

BACKGROUND

One of the unique advantages of any wake-up radio is that it is a wide-band device, so it is listening to all channels at the same time. In unlicensed bands, the radio spectrum must be shared, and this can be accomplished by enforcing frequency hopping by all participants to spread the energy uniformly in the frequency band. For example, in the US federal rules and regulations, enforced by the FCC, in order to transmit at the maximum possible power of 1 Watt, the transmitter must hop across at least 50 channels and never dwell on a single channel for more than 400 ms. With a traditional radio receiver when the sensor first powers-up and joins the network, it is only listening to a single channel and it then has to first find the beacon in frequency to determine the position in the hopping sequence. This initial frequency scan requires power and time. In addition, there is currently very little or no security safeguards for networks that operate in the above-mentioned parameters.

It would be desirable to have a wake-up receiver that overcomes the stated deficiencies of the current art.

DETAILED DESCRIPTION

Embodiments of the invention include a wake-up receiver that is significantly passive in operation, and thus is inherently low-power. The system is low power in part because there is no need for a frequency scan; as it is a broadband device. The time required to first join the network is reduced. Embodiments of the invention combine security with a wake-up radio. This security is to authenticate the wake-up message and prevent replay-attack (or, energy-attacks). While the RF components are passive, digital components are the contributors to the power consumption of the wake-up radio. In an embodiment, a block cipher is involved in the security aspect. The cipher in an embodiment is used in CCM fashion for cryptographically authenticating received wake-up messages. Those wake-up messages are then used as beacons in a MAC-layer protocol.

Figure 1:
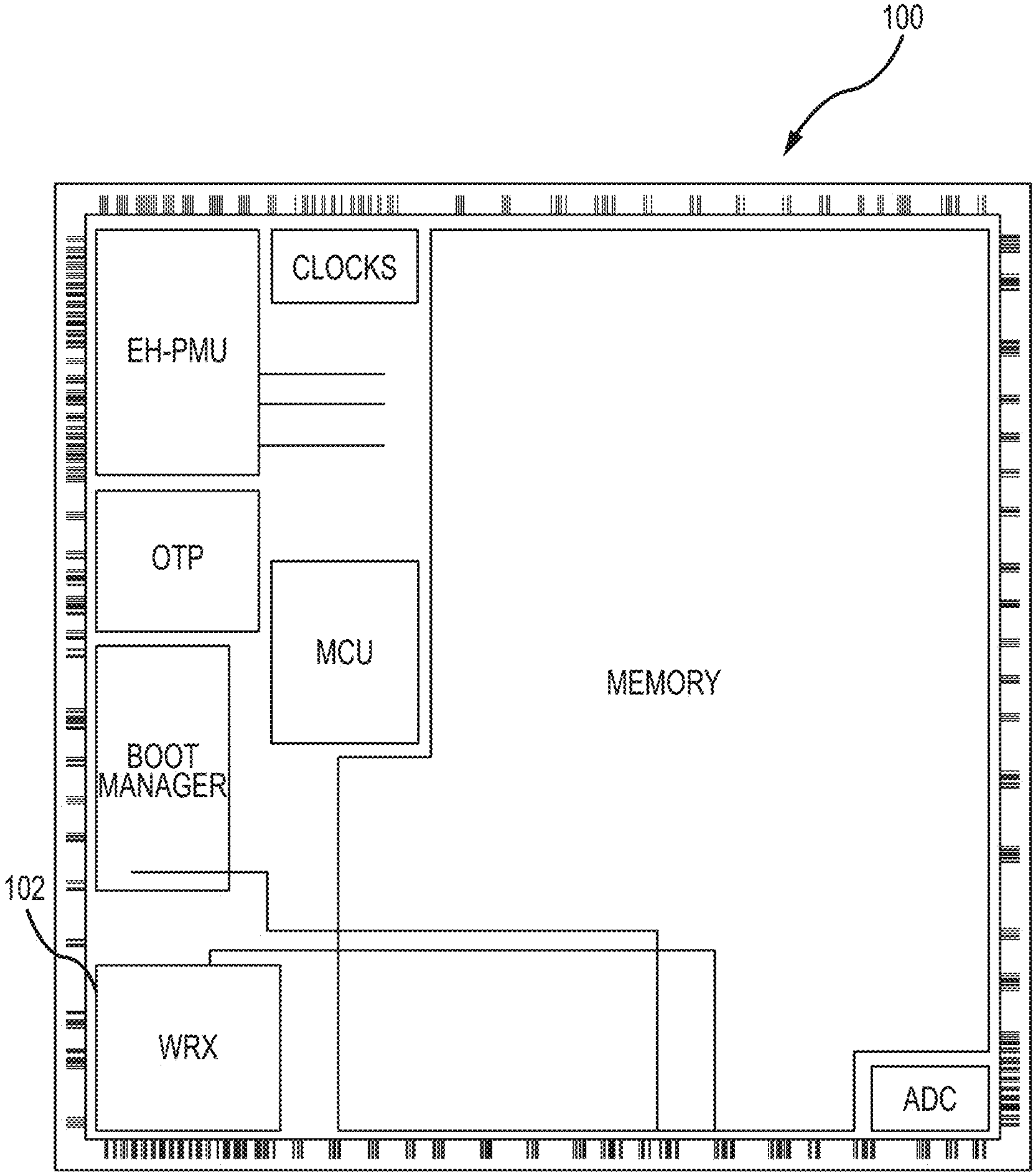
FIG. 1 is a diagram of a semiconductor die that includes a wakeup radio according to an embodiment.

FIG. 1 is a diagram of a system on a chip SoC 100 semiconductor die that houses a low power radio (WRX) 102 to be further described below. FIG. 1 shows the relative size of the WRX on the die. The SoC supports a wireless network protocol that can synchronize a dense network of 1000 sense nodes in real-world environments within range of one gateway. In an embodiment, the physical layer uses on-off keyed WRX beacons for network synchronization and a programmable number of time slots of 802.15.4g frequency-shift keyed data packets for uplink to the cloud, which the SoC secures using AES (as one example). Compared with duty-cycled high-power WRXs with clock drift, an always-on WRX provides lower power time synchronization for dense low-latency networks, especially with shorter intervals between WRX beacons. The wideband WRX beacon also provides initial frequency synchronization between gateway and sense nodes, allowing the gateway to frequency hop.

Figure 2:
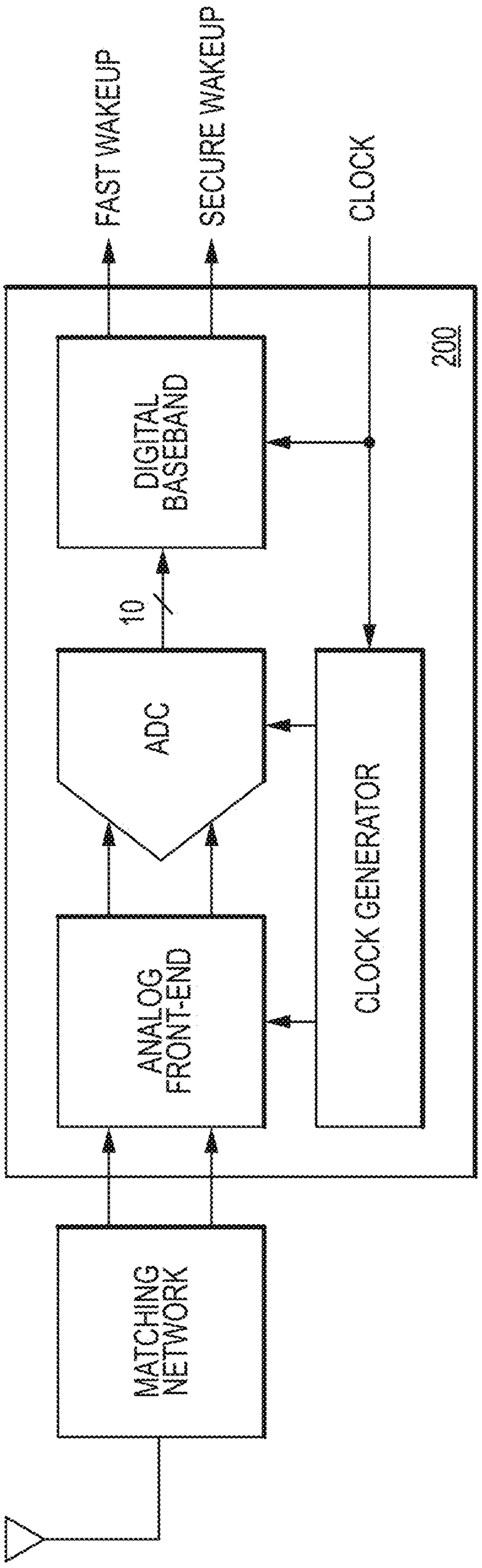
FIG. 2 is a diagram of a wakeup radio according to an embodiment.

FIG. 2 is a block diagram of a WRX according to an embodiment. As shown, WRX 200 communicates with a matching network through an antenna 202. WRX 200 includes an analog front end, an analog to digital converter (ADC), a clock generator, and a digital baseband. WRX 200 outputs a fast wakeup signal, and a secure wakeup signal. WRX 200 also receives a clock signal.

The WRX (FIG. 2) comprises an off-chip matching network to provide passive gain into a rectifier-first analog front-end with baseband gain before conversion by a differential, 10b SAR ADC. The protocol supports both fast wakeups with shorter time-on-air and secure wakeups with in-band burst and continuous wave interference robustness, data payload, and protection against energy or replay attacks. If the digital baseband correlates the received sync word above a threshold, it issues a fast wakeup to the MCU. For secure wakeups, the baseband demodulates a header in the physical layer and passes the secure payload through a cryptographic checksum before issuing a wakeup. The WRX also provides clear-channel assessment (CCA) and RSSI for network link quality tracking.

The wakeup signals, which uses On-Off Keying modulation, consist of a binary sequence of a certain length depending on the application. The sequence can be pseudo random such as Gold Sequence or Maximum Length Sequence (M-sequence) which has good auto correlation and cross correlation properties. While the wakeup signals are down-converted to the baseband through the charge domain analog front-end, digitized by the ADC, the associated binary sequence is demodulated by the baseband PHY block in the WRX 200.

In an embodiment the process of generating the wakeup signals involves demodulating a sequence in the physical layer (digital baseband) and passing that signal through a checksum before issuing a wakeup signal. The wake-up radio computes the signal to noise interference ratio (SNIR) as reported by the digital baseband.

The sequences that are demodulated include without limitation, a Gold sequence, an M sequence, and Zadoff-Chu sequence.

Figure 3:
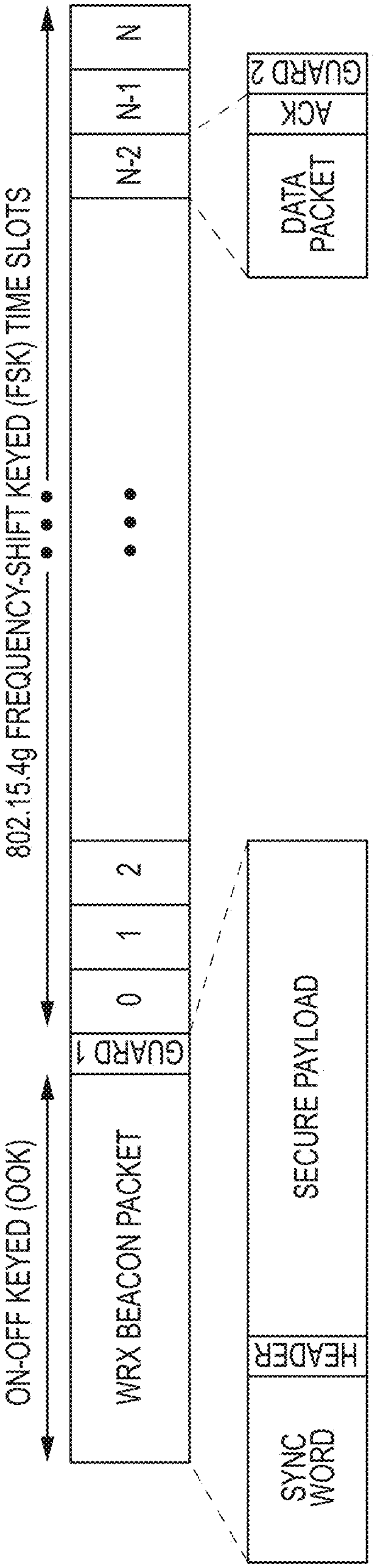
FIG. 3 is a diagram of a TDMA structure according to an embodiment.

FIG. 3 is a diagram of a time division multiple access (TDMA) structure according to an embodiment. This TDMA structure is one example of messaging, but the invention is not so limited.

Figure 4:
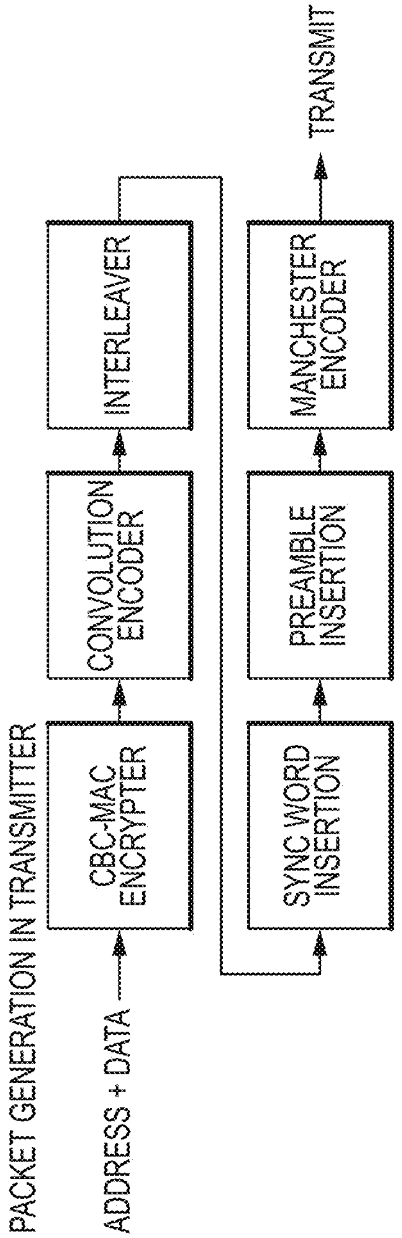
FIG. 4 is a diagram of a packet generation process in a transmitter according to an embodiment.

FIG. 4 is a diagram of packet generation in a transmitter. Address and data enter a CBC-MAC encrypter. Then the encrypted data goes to a convolution encoder, then to an interleaver, then to a sync word insertion element, then to a preamble insertion element, then to a Manchester encoding element. The result is transmit signal 402.

Figure 5:
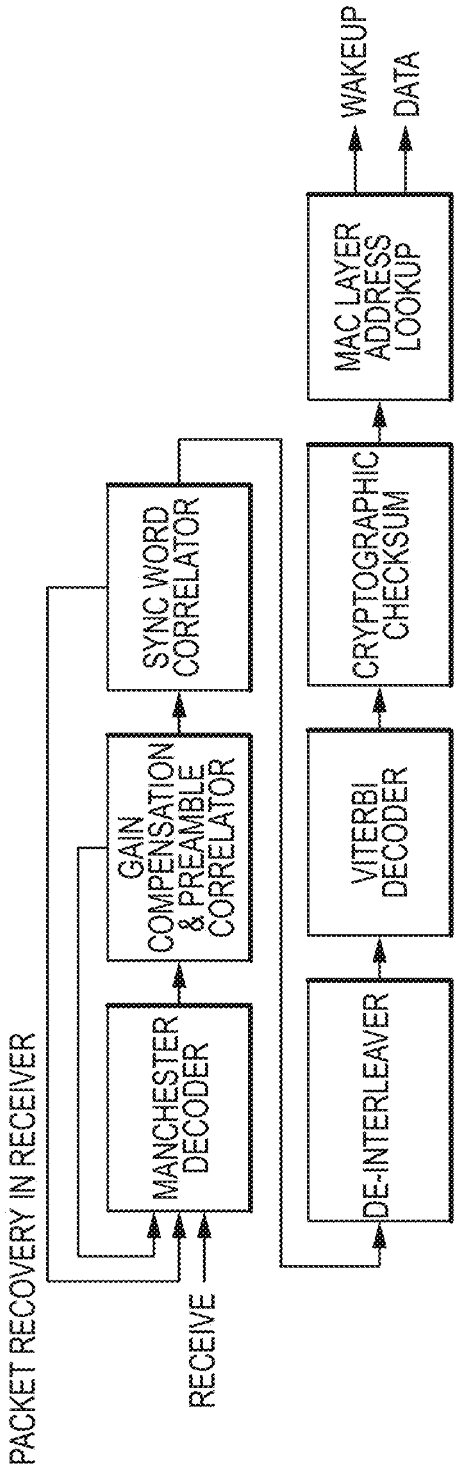
FIG. 5 is a diagram of a packet recovery process in a receiver according to an embodiment.

FIG. 5 is a diagram of packet recovery in a receiver. The transmit signal 402 enters a Manchester decoder, then once, decoded is sent to a gain compensation and preamble correlator (which feeds back to the Manchester decoder). After gain compensation and preamble correlation, the signal enters a sync word correlator (which also feeds back to the Manchester decoder).

The output of the sync word correlator goes through a de-interleaver element, a Viterbi decoder element, a cryptographic checksum element, and a MAC layer address lookup element. The output of the receiver is a wakeup signal and data.

Referring to FIGS. 4 and 5, a packet consists of a Preamble, Sync Word, and Payload (first to last). The Preamble, Sync Word, and PHY Header are prepended to the Payload to form the full packet. Any encoding, such as Manchester encoding, is applied to the full packet during transmission. The transmitter either operates at 1/N the frequency of the receiver, oversamples the data by N, or repeats the data by N, where N could be fixed or variable. The three statements should be equivalent from the perspective of the receiver.

A cryptographic checksum checks the integrity of the payload and authenticates the sender. The integrity check reduces false alarm rates and the authentication helps to prevent replay and energy attacks. A basic CRC only provides an integrity check and reduces false alarm rates. In different embodiments, several error correction codes are applicable. Error codes include convolution codes, block codes and "simple voter" with bit repetition to de-risk the convolution code.

In one embodiment, a Viterbi decoder is used in the receiver. Traditionally, it has a soft-decision algorithm, unlike the hard-decision algorithms of block codes, which allows for higher error-correction performance. The convolution encoder/decoder runs as a state machine. A typical implementation has a rate of 1/2; in other words, every data bit results in two bits in the channel to provide the redundancy to allow error correction.

Figure 6:
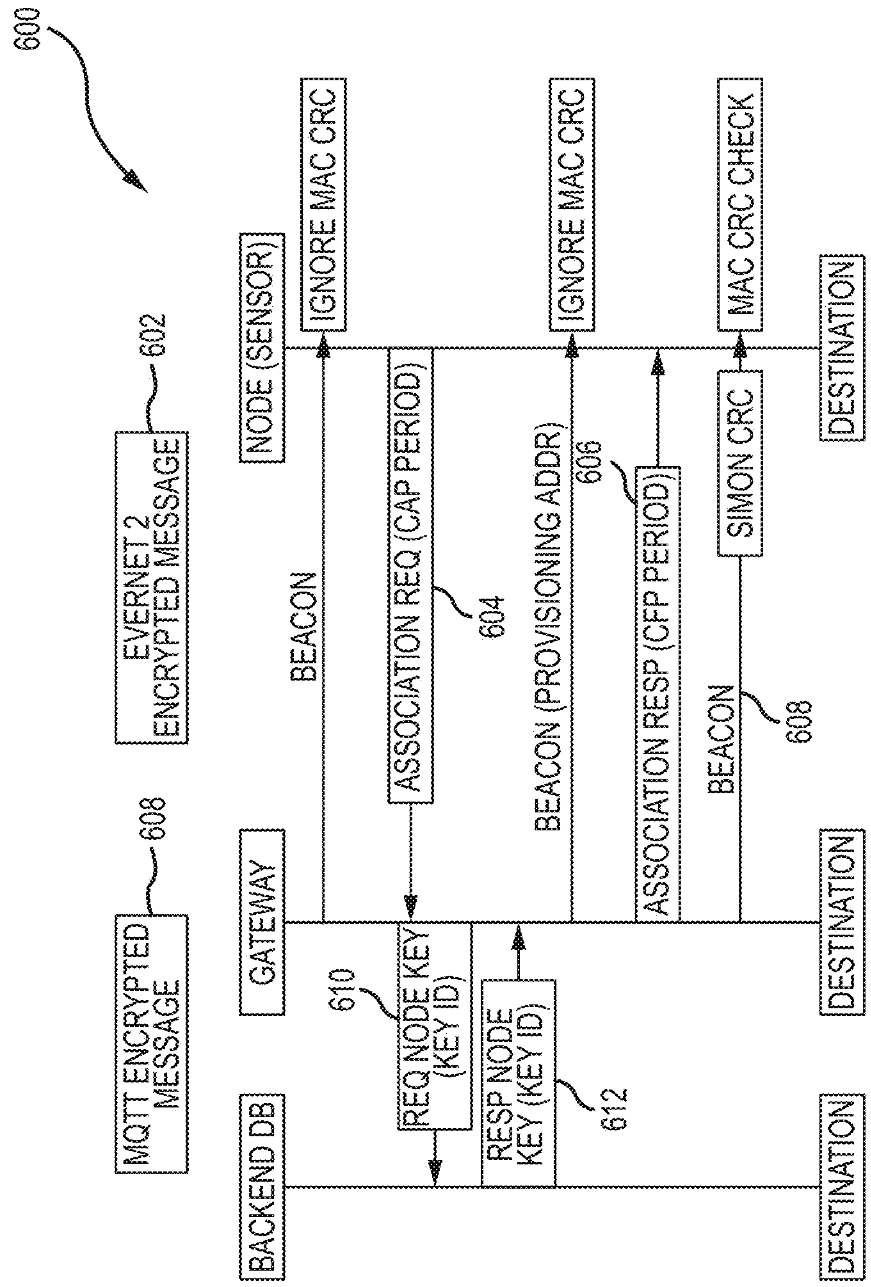
FIG. 6 is a diagram of an association message sequence according to an embodiment.

FIG. 6 is a diagram illustrating an association message sequence 600 according to an embodiment. In a sensor network including a gateway and multiple sensors, an encrypted message 608 and an encrypted message 202 are received by, respectively, a gateway and backend database (DB), and a sensor node in the network. The gateway sends a beacon message to the sensor node, where it ignores the MAC CRC, and in return requires association 604.

The gateway receives the message and transmits a request 610 to the backend DB for a node key. This results in response 612 as shown, and a beacon (provisioning address) message to the node, which again ignores the MAC CRC.

However, the gateway then sends an association response 606 to the node. At the next beacon 608, a CRC check is sent to the node, and this time the MAC CRC is approved by the node to go to destinations.

In a standard 802.15.4g system, the association procedure always follows a channel scan. In an embodiment of the invention, the WRX is based on a wide-band rectifier architecture. This means that the gateway is frequency hopping when transmitting the beacon to be compliant with FCC Rules and Regulations, but the WRX receiver is listening on all channels simultaneously. The gateway scan consists of scanning in time, but not frequency. Listening for the best WRX beacon within the maximum beacon period, and where best is the beacon received with the highest received signal strength indicator (RSSI) as reported by the WRX digital baseband.

In a standard 802.15.4g system, the association response would return to the node in a GTS which is designated by the node's long address. In an embodiment of the invention, the payload of the beacon is limited to short addresses only. A vendor-specific short address is created to accommodate this difference, so any nodes expecting an association response message on the MAC layer will configure the WRX baseband to filter for the provisioning short address. Any nodes that detect a beacon with the provisioning short address will thus enable the COTS radio to listen on the specified GTS.

When the association response is received, the node is assigned a short address which is used for all future GTS assignments. The association response contains the gateway-specific beacon key and gateway-specific broadcast key. The beacon key is used to authenticate and filter WRX beacons (so that the node ignores other gateways). The broadcast key is used to encrypt broadcast downlink messages which are delivered to all nodes associated with the gateway.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to conduct a goal-directed semantic search. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which will be set forth in the forthcoming claims.

What is claimed is:

1. A wake-up radio system in a wireless sensor network, the wake-up radio comprising:

an analog front end configured to communicate with a matching network; wherein the matching network receives wakeup signals from multiple channels simultaneously, wherein scanning comprises listening for best beacon signals comprising beacons with highest received signal strength indicator (RSSI);

an analog to digital converter coupled to the analog front; and a digital baseband coupled to the analog to digital converter, wherein the digital baseband outputs a fast wake-up signal, a secure wakeup signal, and a clock signal, wherein for the wakeup signals, a sequence is demodulated in a physical layer and is passed through a checksum before issuing a wakeup signal, wherein the sequence comprises one or more of a Gold sequence, an M sequence and a Zadoff-Chu sequence, and wherein the system computes the signal to noise interference ratio (SNIR) as reported by the digital baseband and participates in an association message sequence that comprises a node in the wireless sensor network being assigned a gateway-specific beacon key.

2. The system of claim 1, wherein the wake-up radio participates in an association message sequence that comprises a node in the wireless sensor network being assigned a gateway-specific broadcast key.

3. The system of claim 2, wherein the broadcast key is used to encrypt broadcast downlink messages which are delivered to all nodes associated with the gateway.

4. The system of claim 2, wherein the broadcast key is used to encrypt unicast downlink messages which are delivered to a specific node associated with the gateway.

5. The system of claim 1, wherein the beacon key is used to authenticate and filter beacon signals in the network so that the node ignores other gateways.

6. The system of claim 1, wherein wake-up messages are cryptographically authenticated and then used as beacons.

7. The system of claim 1, wherein Manchester encoding is used to encode the symbols of the physical layer.

8. A wireless sensor in a wireless sensor network, the wireless sensor comprising:

an always-on wake-up radio comprising:

an analog front end configured to communicate with a matching network; wherein the matching network receives beacon signals from multiple channels simultaneously, wherein scanning consists of scanning in time rather than frequency, and wherein scanning comprises listening for best beacon signals comprising beacons with highest received signal strength indicator (RSSI);

an analog to digital converter coupled to the analog front end; and a digital baseband coupled to the analog to digital converter, wherein the digital baseband outputs a fast wake-up signal, a secure wakeup signal, and a clock signal, wherein for the wakeup signals, a sequence is demodulated in a physical layer and is passed through a checksum before issuing a wakeup signal, wherein the sequence comprises one or more of a Gold sequence, an M sequence and a Zadoff-Chu sequence, and wherein the system computes the signal to noise interference ratio (SNIR) as reported by the digital baseband and participates in an association message sequence that comprises a node in the wireless sensor network being assigned a gateway-specific beacon key.

9. The wireless sensor of claim 8, wherein the wake-up radio participates in an association message sequence that comprises a node in the wireless sensor network being assigned a gateway-specific beacon key.

10. The wireless sensor of claim 8, wherein the wake-up radio participates in an association message sequence that comprises a node in the wireless sensor network being assigned a gateway-specific broadcast key.

11. The wireless sensor of claim 8, wherein the beacon key is used to authenticate and filter beacon signals in the network so that the node ignores other gateways.

12. The wireless sensor of claim 8, wherein the broadcast key is used to encrypt broadcast downlink messages which are delivered to all nodes associated with the gateway.

13. The wireless sensor of claim 8, wherein the broadcast key is used to encrypt unicast downlink messages which are delivered to a specific node associated with the gateway.

14. The wireless sensor of claim 8, wherein wake-up messages are cryptographically authenticated and then used as beacons.

15. The wireless sensor of claim 8, wherein Manchester encoding is used to encode the symbols of the wake-up radio physical layer.

16. A method for operating a wireless sensor in a wireless sensor network, the method comprising:

communicating with a matching network using an analog front end of a wake-up radio, wherein the matching network receives beacon signals from multiple channels simultaneously;

scanning for signals, wherein scanning comprises listening for best beacon signals comprising beacons with highest received signal strength indicator (RSSI);

outputting a fast wake-up signal using a digital baseband coupled to an analog to digital converter;

outputting a secure wake-up signal using a digital baseband coupled to an analog to digital converter;

outputting a clock signal using a digital baseband coupled to an analog to an digital converter;

demodulating a sequence in the digital baseband and passing it through a checksum before issuing a wakeup signal;

for a secure wakeup signal, demodulating a header in a physical layer; and passing a secure payload through a cryptographic checksum before issuing a wakeup signal, wherein the wake-up radio computes the signal to noise to interference (SNIR) as reported by the digital baseband.

17. The method of claim 16, further comprising the wake-up radio participating in an association message sequence that comprises a node in the wireless sensor network being assigned a gateway-specific beacon key.

18. The method of claim 17, further comprising using the broadcast key to encrypt unicast downlink messages which are delivered to a specific node associated with the gateway.

19. The method of claim 16, further comprising the wake-up radio participating in an association message sequence that comprises a node in the wireless sensor network being assigned a gateway-specific broadcast key.

20. The method of claim 19, further comprising using the beacon key to authenticate and filter beacon signals in the network so that the node ignores other gateways.

21. The method of claim 16, further comprising using the broadcast key to encrypt broadcast downlink messages which are delivered to all nodes associated with the gateway.

22. The method of claim 16, further comprising cryptographically authenticating wake-up messages and using them as beacons.

* * * * *